Figure 1:
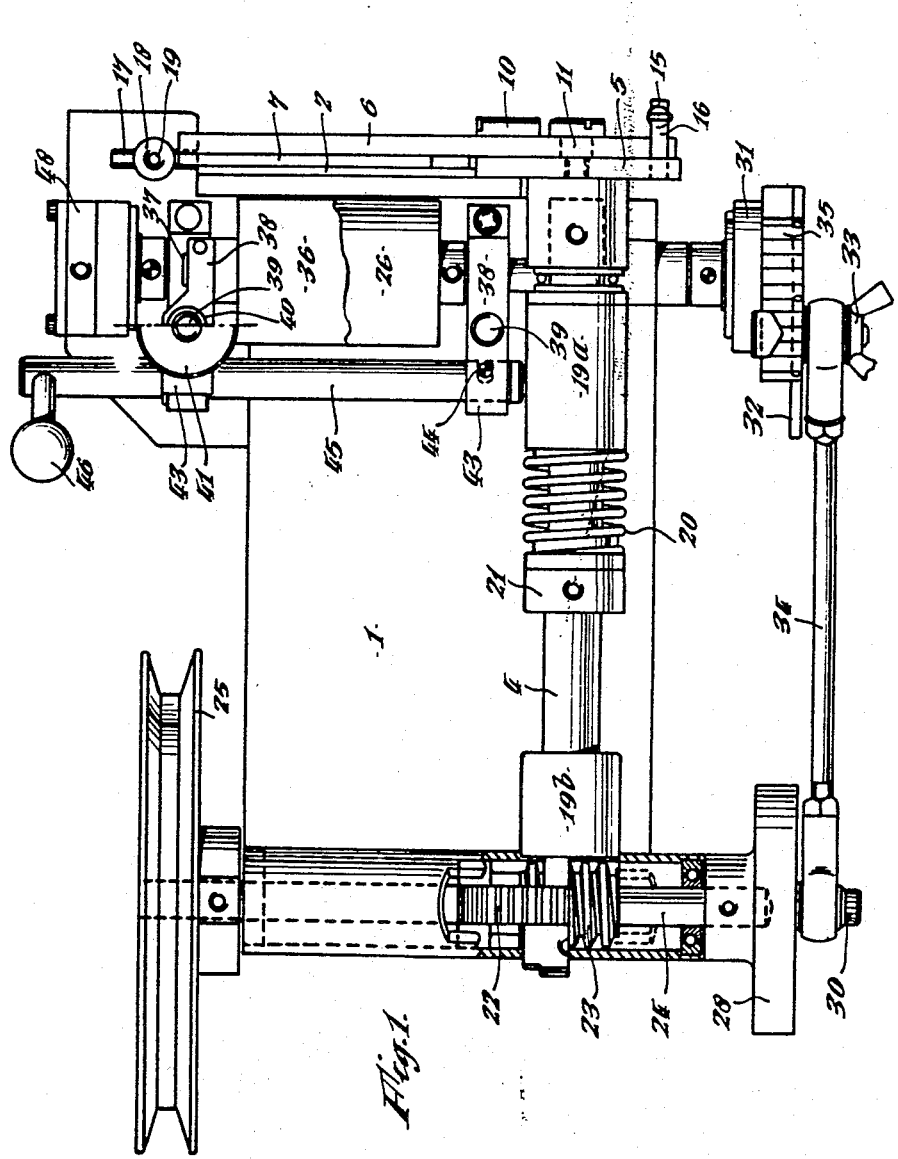

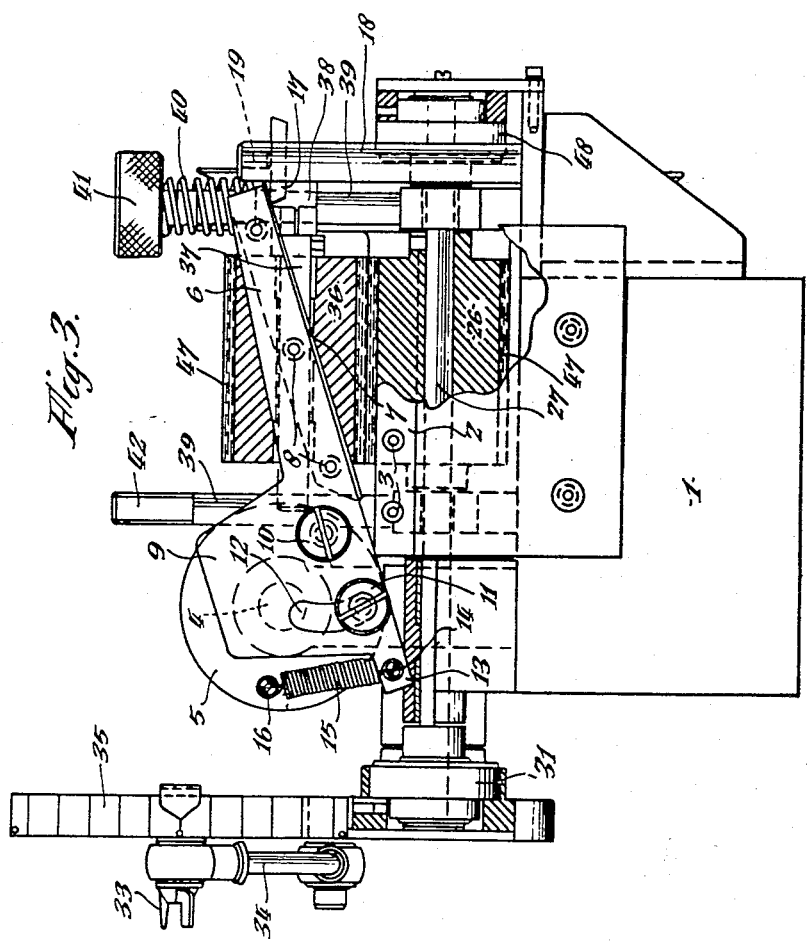

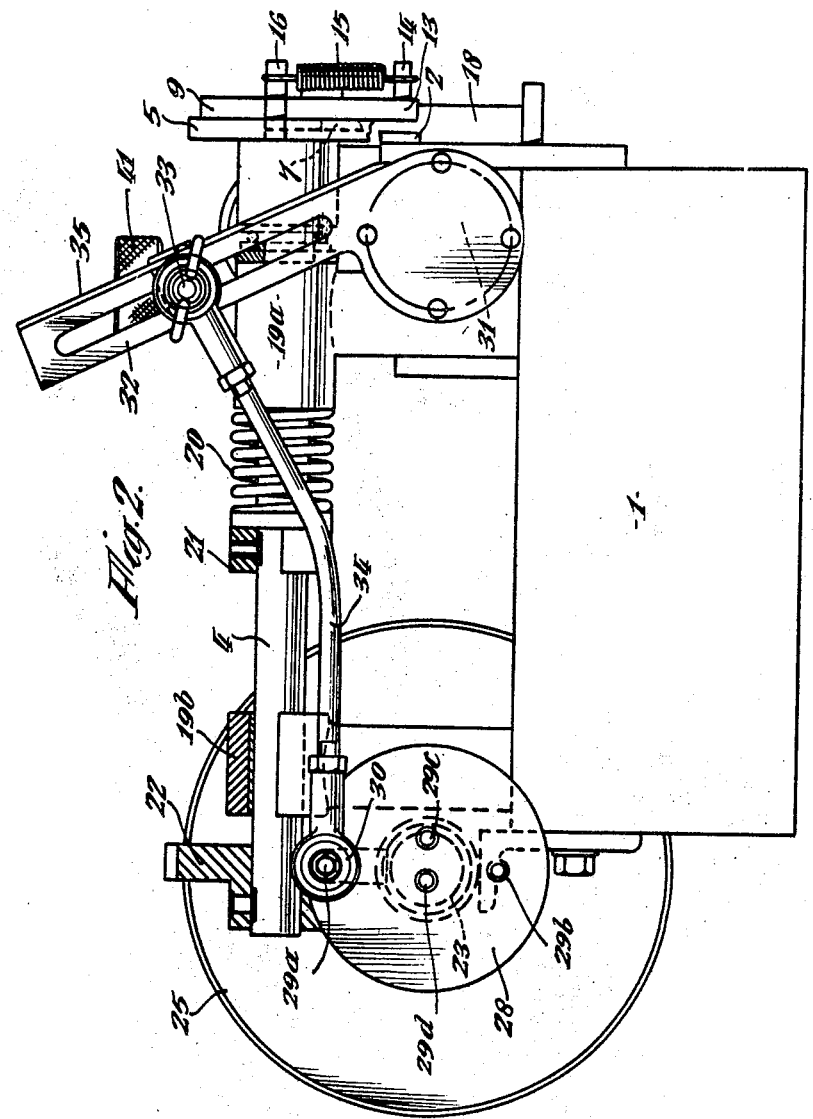

3,180,193
MACHINES FOR CUTTING LENGTHS OF
STRIP MATERIAL
David Benedict and Joseph Robinson Bellerby, both of 60–62 Westmorland Road, Newcastle upon Tyne, England
Filed Feb. 25, 1963, Ser. No. 260,534
5 Claims. (Cl. 83—355)

This invention relates to machines for cutting lengths of strip material, such as tape, braid, ribbon, elastic tape, upholstery webbing, paper or plastic tape, and like materials.

An object of the invention is to improve the versatility of such machines by increasing the range of predetermined lengths and the range of kinds of strip material which can be cut, and the rate of production, while simplifying the mechanism compared with that of the known machines serving a similar purpose.

The invention provides a machine for cutting lengths of strip material comprising a fixed cutter blade, a rotary cutter blade co-operating with said fixed blade, means for driving said rotary blade and means for feeding a continuous strip of material across said fixed blade to be periodically cut by said rotary blade, at least one of said driving and feeding means being adapted for adjustment of the relative rates of rotation of the rotary blade and of linear feed of the strip.

Advantageously, the rotary blade may be driven at constant speed and the strip feeding means may be adapted to effect a variable rate of linear feed.

The rotary blade may be mounted for angular displacement relative to its axis of rotation, with resilient loading means. Said rotary blade may co-operate with means for retarding its rotation relative to a driving element and so stressing said resilient means, the retarding means becoming ineffective as the rotary blade approaches the fixed blade, to release said resilient means and thereby cause the rotary blade to sweep across the fixed blade rapidly or virtually instantaneously, preferably with a scissors action.

The machine may have two or more rotary blades (each of which may or may not be angularly displaceable as aforesaid) equi-angularly mounted on a driving element.

The variable speed feeding means for the strip material may comprise feed rollers at least one of which is rotatable by a one-way clutch device, driven by variable crank means so that the average peripheral speed of said driven roller is adjustable to determine the length of material fed across the fixed blade between successive operations of the rotary blade. In order to increase the range of lengths that can be fed, said variable crank means may comprise a driving element having a radially adjustable crank pin to which one end of a link is articulated, and a driven element associated with the driving member of said one-way clutch, which driven element also has a radially adjustable pin to which the other end of said link is articulated.

The foregoing and other features of the invention will be better understood from the following description by way of example, of an embodiment, with reference to the accompanying drawings, wherein:

FIG. 1 is a plan view of a machine,
FIG. 2 is a side elevation, and
FIG. 3 is a front elevation of the same.

In the illustrated embodiment, a fixed base 1 has a fixed, straight cutter blade 2 secured, preferably horizontally, at one end, for example by screws 3 with sunk heads so that the blade 2 is removable for sharpening or replacement. Traversing the base perpendicularly to the edge of said blade 2 is a shaft 4, on one end of which is mounted a disc 5 to which is pivoted a carrier arm 6 for a straight rotary blade 7. The latter is secured to said arm 6 also by screws 8 with sunk heads so as to be removable. The disposition of such rotary blade 7 is such that as it passes the fixed blade 2 once in each revolution the two blade edges co-operate to effect a precise shearing cut. Said carrier arm 6 extends from a pivot plate 9 mounted on said rotary disc 5 by one pin 10 therein, and guided and stabilised by another pin 11 which passes through an arcuate slot 12 in the plate 9 and is secured in the disc 5. Opposite said arm 6 the plate 9 has a lug 13 carrying a pin 14 to which is anchored one end of a tension spring 15, the other end of the spring being anchored to a pin 16 on the rotary disc 5.

Above the fixed blade 2, and in the path of the end of the rotary blade 7 or carrier arm 6 there is secured a retarding nose element 17, clamped in a transverse slot in a pillar 18 by a grub screw 19. This nose is so located that it arrests the outer end of the blade 7 as the inner end of said blade approaches the corresponding end of the fixed blade 2. As said disc 5 continues to rotate, the pivot pin 10 moving downwards and away from said nose 17, the end of the rotary blade 7 is drawn across said nose until it is released, and since during the arrest the spring 15 has been stressed, thereby upon release the rotary blade 7 is snapped down across and along the fixed blade 2, with a scissors motion, to achieve a quick and clean shearing action.

Said shaft 4 is mounted in suitable bearings 19a, 19b and is biassed by resilient means such as a coil spring 20 surrounding the shaft 4, and compressed between the bearing 19a and a collar 21, to promote effective co-operation between the two blades. The other end of said shaft 4 has secured to it a worm wheel 22, in mesh with a worm 23 on a main shaft 24 carrying a pulley 25 and thereby connected as by a belt drive to a power source such as an electric motor. The rotary blade 7, is thus driven at constant speed.

Adjacent the fixed blade there is mounted horizontally on the base 1 a driven feed roller 26. The driving shaft 27 for said roller extends across the base 1 parallel to said worm shaft 24, which is also horizontal and preferably located beneath the worm wheel 22. Secured to an end of said worm shaft 24 is a driving crank disc 28 having a plurality of locating apertures 29a, 29b, 29c and 29d for a crank pin 30 at different radii. On the roller shaft 27 there is secured a one-way clutch 31, for example of the ratchet type or preferably of the wedge roller type, arranged to rotate the feed roller 26 so that strip material is fed over it to the fixed blade 2. Attached to the driving element of said clutch is an upwardly extending driven slotted crank 32 in which another crank pin 33 is securable at an adjusted radius. Said two crank pins 30, 33 are connected by a rigid link 34, which may include provision for adjustment of its length.

The location of the crank pin 30 in the driving crank disc 28 determines the stroke of the link 34, while the location of the crank pin 33 in the driven crank 32 determines the angular displacement thereof in relation to the linear displacement of the link; evidently, as the crank pin 33 in said driven crank 32 is moved nearer the axis, the angular displacement of said driven crank 32 and the feed roller 26 is increased for a given displacement of the link. This, together with the diameter of the feed roller, determines the rate of feed of the strip material, and since the worm shaft 24 rotates at higher (preferably much higher) speed than the worm wheel shaft 4 which drives the rotary blade 7, a substantial length of feed can be achieved between successive cutting operations.

As shown the driving crank disc 28 has four pin-receiving holes so spaced radially that the displacement of the link 34 is varied by predetermined increments. The driven crank 32 may then have its slot calibrated, for example, with a scale 35 of 10 divisions (and subdivisions if required) so that when the driving crank pin 30 is in the innermost hole 29d in said disc 28 the feed may be varied from a minimum (between successive cutting operations) when the driven pin 33 is at the outermost scale mark to a greater length when said driven crank is at the innermost scale mark on the driven crank 32; while location of the driving pin in each of the more outwardly disposed holes 29c, 29b, 29a in said disc adds a predetermined increment to the length of feed. This arrangement thus enables any required length of feed to be predetermined.

Said driven feed roller 26 co-operates with an idler roller 36 which is resiliently urged downwards into contact with a strip of material passing over the feed roller 26. Said sprung roller is mounted on a spindle 37 which is carried by two arms 38 slidable on vertical rods 39. The resilient loading is effected by a pair of coil springs 40 bearing on said arms 38 and having their upper ends located beneath adjusting knobs 41 which are internally screw-threaded and mounted on screw-threaded upper portions 42 of the rods 39, so as to vary the leverage exerted by the springs on the roller 36. The arms 38 have rearward extensions 43 engaged from beneath by a pair of vertical push rods 44, the lower ends of which bear upon cams mounted on, or cam-form portions of, a spindle 45 mounted in bearings on the base 1 to the rear of and parallel with the spindle 27 of feed roller 26. The spindle 45 is turnable by a lever 46 so as to raise the arms 38, and with them the roller 36, to facilitate the initial location between the rollers of a strip of material to be cut.

The rollers as shown are provided with bonded coverings 47 of rubber or plastic or similar material, to ensure that the material to be cut is fed at a rate equal to the peripheral speed of the driven roller 26. The spindle 27 is also provided, on the end remote from its driving clutch 31, with a similar clutch 48 or equivalent, for example, pawl and ratchet device, effective in the opposite direction to prevent reverse rotation of the spindle 27 when the crank 32 is swinging rearwardly.

In a modification a pair of feed rollers such as 26 may be provided with their axes parallel and in a horizontal plane so that the spring roller 36 tends to enter between them. The drive from feed roller 26 on the shaft 27 to the other feed roller may be effected through gear wheels on the ends of all three rollers, so ararnged that a gear on the shaft 27 engages a gear on the sprung roller 36 and the latter gear engages a gear on the second feed roller, whereby the two feed rollers are driven in the same direction while the sprung roller is driven in the opposite direction.

In a machine as described, strip material of various kinds, used for example in the clothing trade, or as herein first mentioned, can evidently be fed from a suitably located, freely rotatable reel, through the feed rollers 26, 36 (preferably with intervening guide means for the strip) at any desired average speed according to the adjustment of the crank-linkage system 28–34 for driving said feed roller 26. The feed is positive, so that successive lengths of a precise dimension can be fed and cut off at each operation of the rotary blade. Furthermore, by reason of the one-way clutch 31 in the feed roller drive, the operation may be so adjusted that a cutting action takes place during a period when the strip is not being fed.

By a suitable arrangement of supply reels, a superposed plurality of strips of material (for example when said material is relatively easily cut) may be fed simultaneously through the feed rollers, so that each operation of the blades cuts off a plurality of equal lengths of the material. Alternatively, by a suitable arrangement of supply reels and suitable guide means, a plurality of strips of material may be fed side by side, each in single ply, through the feed rollers, again for the cutting of a plurality of strips of equal length by each action of the blades.

The machine as described by way of example is arranged for cutting perpendicularly across the strips.

In a modification to enable the machine to cut at a variable angle obliquely across the strips, a feed roller system may be mounted on a plate or frame which is angularly displaceable about a vertical pivot on the base 1. Said plate or frame may for example carry bearings for the driven feed roller and the rods 39 which support the sprung roller 36, as well as the cam spindle 45. The end of said plate or frame remote from the pivot may be adjustable by any suitable means, for example by a wing nut on a stud upstanding from the base, which passes through an arcuate slot in said plate or frame, said slot being marked with an angular scale. In order to enable the angular displacement of such a feed arrangement while the drive shaft 27 for one feed roller does not correspondingly move, said feed roller for example may be a hollow drum provided internally with a universal coupling, the centre of which is located vertically above the pin about which the plate or frame is displaceable. Preferably such pin and the coupling above it are located adjacent the end of the fixed blade remote from the shaft driving the rotary blade, so that one end of said roller remains at a substantially constant distance from the fixed blade.

The machine above described is adapted to perform ten cutting operations per minute, but the speed of the single rotary blade may be substantially increased without affecting the efficiency of the cutting operation. Further, the machine may be provided with two rotary blades, mounted 180° apart on a suitable modification of the driving disc 5 or an equivalent spider, the arms 6 also being modified is desired to accommodate the double blade arrangement. Means may also be provided, such as epicyclic gear means in association with the worm wheel 22, for varying the speed of drive shaft 4 relative to that of the feeder drive disc 28.

The blades 2 and 7 as shown have straight edges. If desired, they may be correspondingly curved, to cut the portions of material on curved lines, or may be serrated to provide pinked edges on the cut portions.

What we claim and desire to secure by Letters Patent is:

1. A machine for cutting lengths of strip material comprising a fixed cutter blade, a rotatable cutter blade having a cutting edge of similar shape to that of said fixed blade and co-operating with said fixed cutter blade, means for driving said rotatable cutter blade and means for feeding a continuous strip of material across said fixed blade to be periodically cut by said rotatable blade, at least one of said driving and feeding means being adapted for adjustment of the relative rates of rotation of the rotatable blade and of linear feed of the strip, said driving means for said rotatable cutter blade comprising a member mounted for rotation about an axis, means for rotating said member, means pivoting said rotatable cutter blade adjacent a first end thereof to said member about an axis parallel to and spaced from said rotational axis of said member thus allowing rotational and lateral movements of said rotatable blade relative to said member, said axes being so disposed that said rotatable blade moves across said fixed blade with a scissors and lateral action, resilient means acting between said member and said rotatable blade to bias said rotatable blade to a normal position relative to said member, stop means located in the path of a second end of said rotatable blade and operative to arrest said rotatable blade as it approaches said fixed blade, and to become ineffective as said first end of said rotatable blade comes adjacent to said fixed blade, rotation of said member during the period when said rotatable blade is arrested causing said resilient means to become stressed so that when said stop means becomes ineffective said resilient means and said rotation of said member cause said rotatable blade to sweep rapidly across said fixed blade with said scissors action.

2. A machine according to claim 1 having at least two rotatable blades pivotally mounted on said member, said pivotal mountings being equiangularly spaced.

3. A machine according to claim 1 wherein said feeding means for said strip material comprises feed rollers, a one-way clutch device through which at least one of said rollers is driven and variable crank means comprising a driving element, a crank pin, means mounting said crank pin for radial adjustment on said driving element, a link having a first end articulated to said crank pin, a driven element operatively connected to a driving member of said one-way clutch, a pin to which a second end of said link is articulated, and means mounting said pin for radial adjustment on said driven element whereby the average peripheral speed of said driven element and thus of said feed rollers is adjustable to determine the length of material fed across said fixed blade between successive operations of said rotatable blade.

4. A machine according to claim 3 having a pivot perpendicular to the axes of said feed rollers, said feeding means being mounted on said pivot so as to be angularly displaceable, and having one of said feed rollers in the form of a hollow drum, a universal coupling being enclosed within said hollow drum and located on the axis of said pivot, and a shaft being provided connecting said universal coupling to said one-way clutch.

5. A machine according to claim 1 having a pivot perpendicular to the plane of said strip material when passing over said fixed cutter blade, said feeding means being mounted on said pivot so as to be angularly displaceable, and said feeding means including a feed roller in the form of a hollow drum, a universal coupling enclosed within said hollow drum and located on the axis of said pivot, and driving means for rotating said hollow drum through said universal coupling.

References Cited by the Examiner

UNITED STATES PATENTS

| 807,239 | 12/05 | Britton | 83—586 |
| 981,534 | 1/11 | Craig | 83—586 |
| 995,465 | 6/11 | Jaegle | 83—244 |
| 1,958,537 | 5/34 | Glass | 83—244 |
| 2,134,949 | 11/38 | Lupien | 83—244 |
| 2,495,885 | 1/50 | Blume | 226—142 |
| 2,514,261 | 7/50 | Scheffey | 226—142 |

ANDREW R. JUHASZ, *Primary Examiner.*